United States Patent
Cha et al.

(10) Patent No.: US 12,041,193 B2
(45) Date of Patent: Jul. 16, 2024

(54) MOBILE TERMINAL

(71) Applicant: LG ELECTRONICS INC., Seoul (KR)

(72) Inventors: Youngdo Cha, Seoul (KR); Jungyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 327 days.

(21) Appl. No.: 17/436,523

(22) PCT Filed: May 8, 2019

(86) PCT No.: PCT/KR2019/005512
§ 371 (c)(1),
(2) Date: Sep. 3, 2021

(87) PCT Pub. No.: WO2020/189843
PCT Pub. Date: Sep. 24, 2020

(65) Prior Publication Data
US 2022/0182476 A1 Jun. 9, 2022

Related U.S. Application Data

(60) Provisional application No. 62/820,836, filed on Mar. 19, 2019.

(51) Int. Cl.
*H04M 1/02* (2006.01)
(52) U.S. Cl.
CPC ....... *H04M 1/0268* (2013.01); *H04M 1/0216* (2013.01); *H04M 1/0247* (2013.01)

(58) Field of Classification Search
CPC . H04M 1/0268; H04M 1/0216; H04M 1/0247
USPC .................................................. 455/575.3
See application file for complete search history.

(56) References Cited

U.S. PATENT DOCUMENTS

| | | | | |
|---|---|---|---|---|
| 9,021,657 | B2* | 5/2015 | Park ................. | G06F 1/1681 |
| | | | | 16/354 |
| 9,176,701 | B2* | 11/2015 | Becze ............... | H05K 5/0017 |
| 9,204,565 | B1* | 12/2015 | Lee ................... | E05F 1/1016 |
| 9,348,450 | B1* | 5/2016 | Kim .................. | H04M 1/0268 |
| 9,572,272 | B2* | 2/2017 | Lee ..................... | G09F 9/301 |
| 9,603,271 | B2* | 3/2017 | Lee ................... | H04M 1/0268 |

(Continued)

FOREIGN PATENT DOCUMENTS

| | | |
|---|---|---|
| CN | 108173995 A | 6/2018 |
| KR | 10-2013-0120703 A | 11/2013 |

(Continued)

*Primary Examiner* — April G Gonzales
(74) *Attorney, Agent, or Firm* — Birch, Stewart, Kolasch & Birch, LLP

(57) ABSTRACT

The present invention relates to a foldable mobile terminal characterized by comprising: a foldable body; a flexible display panel which is provided on one surface of the body and folds together with the body; and a protective cover covering the flexible display panel. The protective cover comprises a first cover covering a foldable first area in the flexible display panel, and a second cover covering second covers provided on both sides of the first area in the flexible display panel. The second cover is made of a material which is different from the material of the first cover, and has a higher rigidity than the first cover.

20 Claims, 17 Drawing Sheets

(56) References Cited

U.S. PATENT DOCUMENTS

| | | | |
|---|---|---|---|
| 10,082,827 B2* | 9/2018 | Yamauchi | G06F 1/1652 |
| 10,215,332 B2* | 2/2019 | Lee | G06F 1/1652 |
| 10,274,997 B2* | 4/2019 | Lin | H04M 1/0268 |
| 10,360,825 B1* | 7/2019 | Wu | H01L 29/78603 |
| 10,416,710 B2* | 9/2019 | Mizoguchi | G06F 1/1641 |
| 10,423,019 B1* | 9/2019 | Song | G06F 1/1641 |
| 10,423,263 B2* | 9/2019 | Lee | G06F 1/1616 |
| 10,481,634 B2* | 11/2019 | Mizoguchi | G06F 1/1616 |
| 10,775,852 B2* | 9/2020 | Kim | H05K 5/0226 |
| 10,863,641 B2* | 12/2020 | Jeon | G06F 1/1652 |
| 10,975,603 B2* | 4/2021 | Tazbaz | G06F 1/1616 |
| 11,048,302 B2* | 6/2021 | Seo | H04M 1/0268 |
| 2010/0201604 A1* | 8/2010 | Kee | G06F 1/1641 |
| | | | 345/1.3 |
| 2011/0063783 A1* | 3/2011 | Shim | G06F 1/1615 |
| | | | 361/679.01 |
| 2015/0233162 A1* | 8/2015 | Lee | G06F 1/1641 |
| | | | 16/223 |
| 2015/0261257 A1* | 9/2015 | Yamazaki | G09G 5/14 |
| | | | 345/520 |
| 2016/0212840 A1* | 7/2016 | Koo | G06F 1/1652 |
| 2017/0123461 A1* | 5/2017 | Kim | H05K 5/0017 |
| 2018/0292863 A1* | 10/2018 | Escamilla | G06F 1/1647 |
| 2019/0166703 A1* | 5/2019 | Kim | H05K 5/0226 |
| 2020/0117233 A1* | 4/2020 | Ou | G06F 1/1652 |
| 2020/0117245 A1* | 4/2020 | Ou | H04M 1/0268 |

FOREIGN PATENT DOCUMENTS

| | | |
|---|---|---|
| KR | 10-2017-0077096 A | 7/2017 |
| KR | 10-1847047 B1 | 4/2018 |
| WO | WO2018/062585 A1 | 4/2018 |

\* cited by examiner

FIG. 4
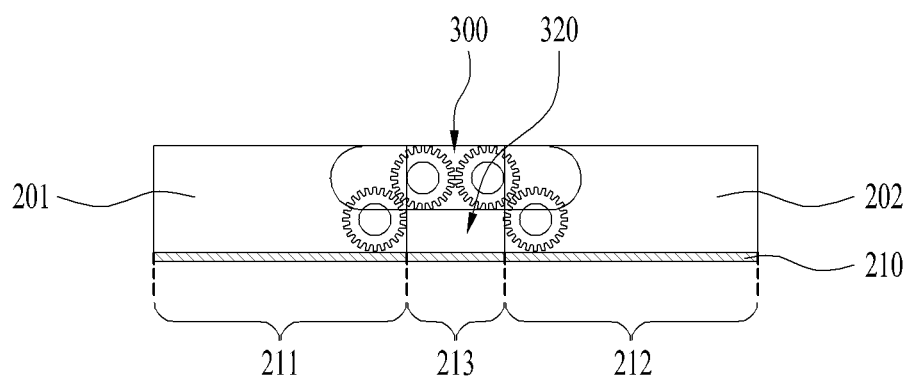
(a)
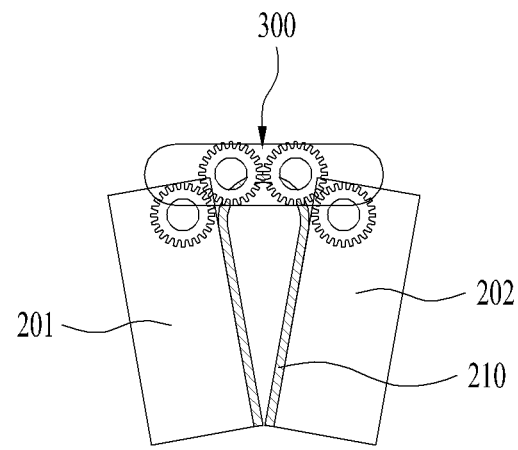
(b)

FIG. 5
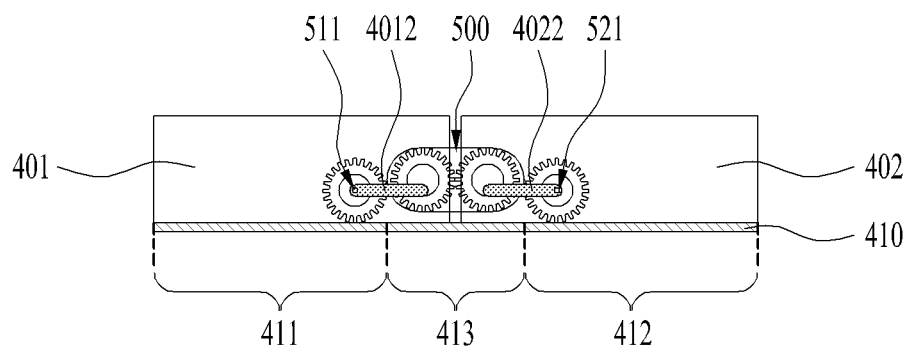
(a)
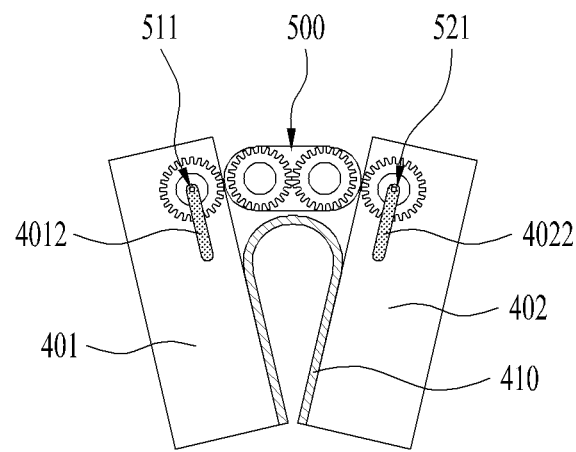
(b)

FIG. 6
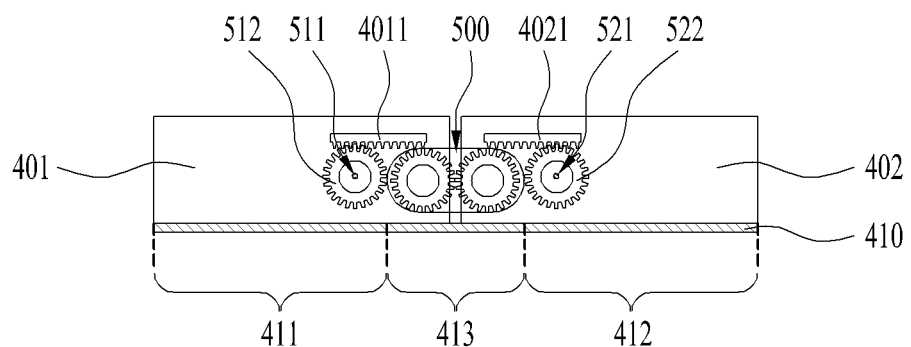
(a)
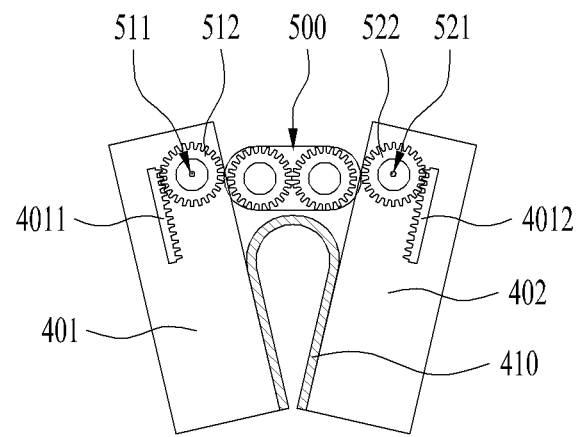
(a)

FIG. 10
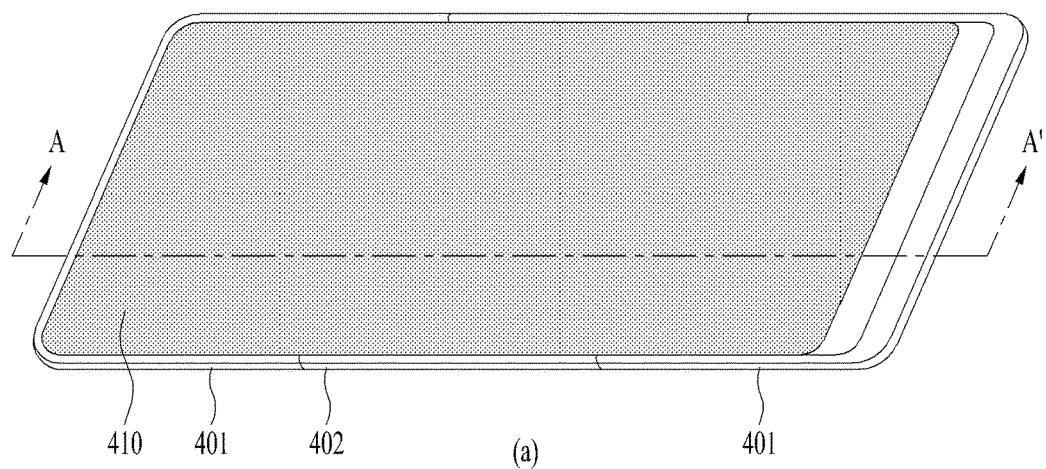
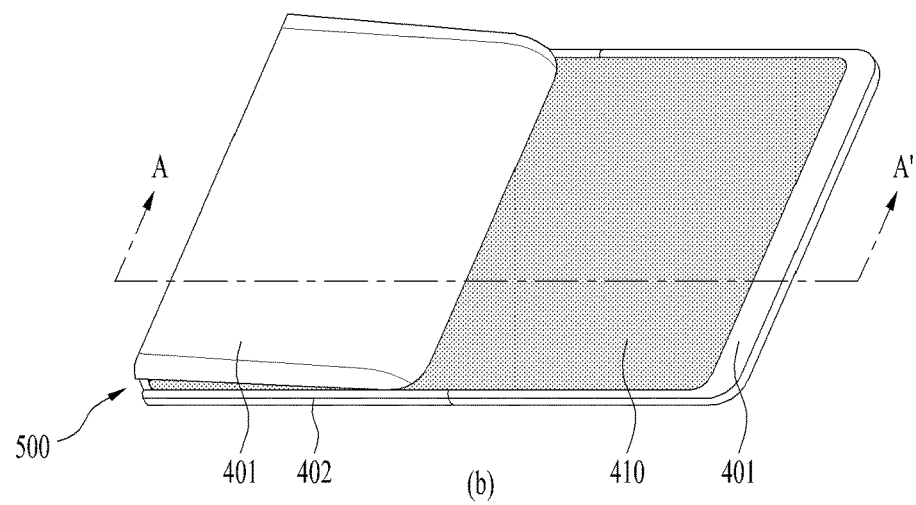
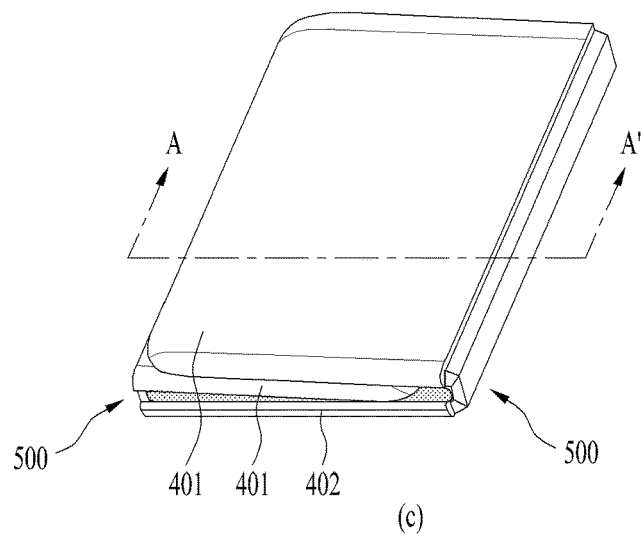

FIG. 11
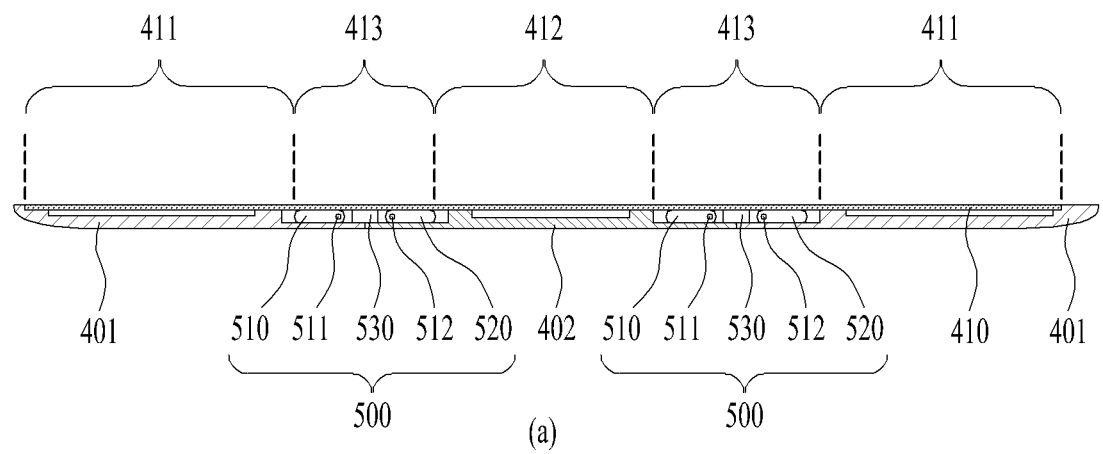
(a)
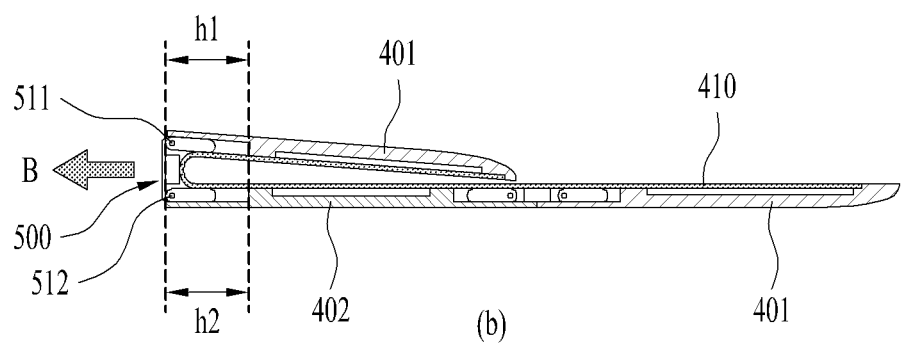
(b)
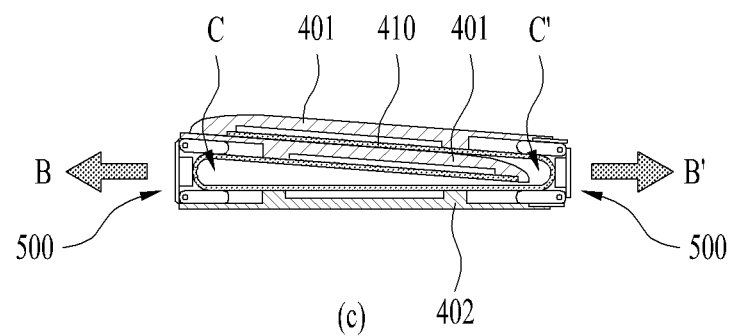
(c)

FIG. 15
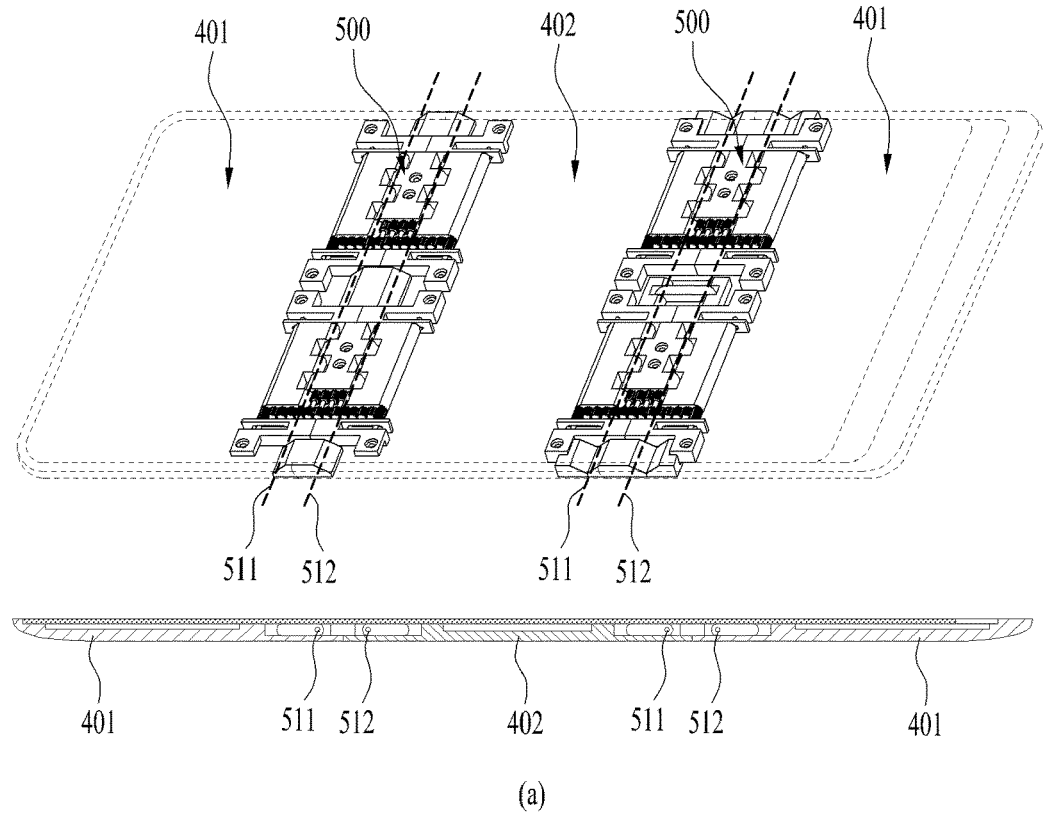
(a)
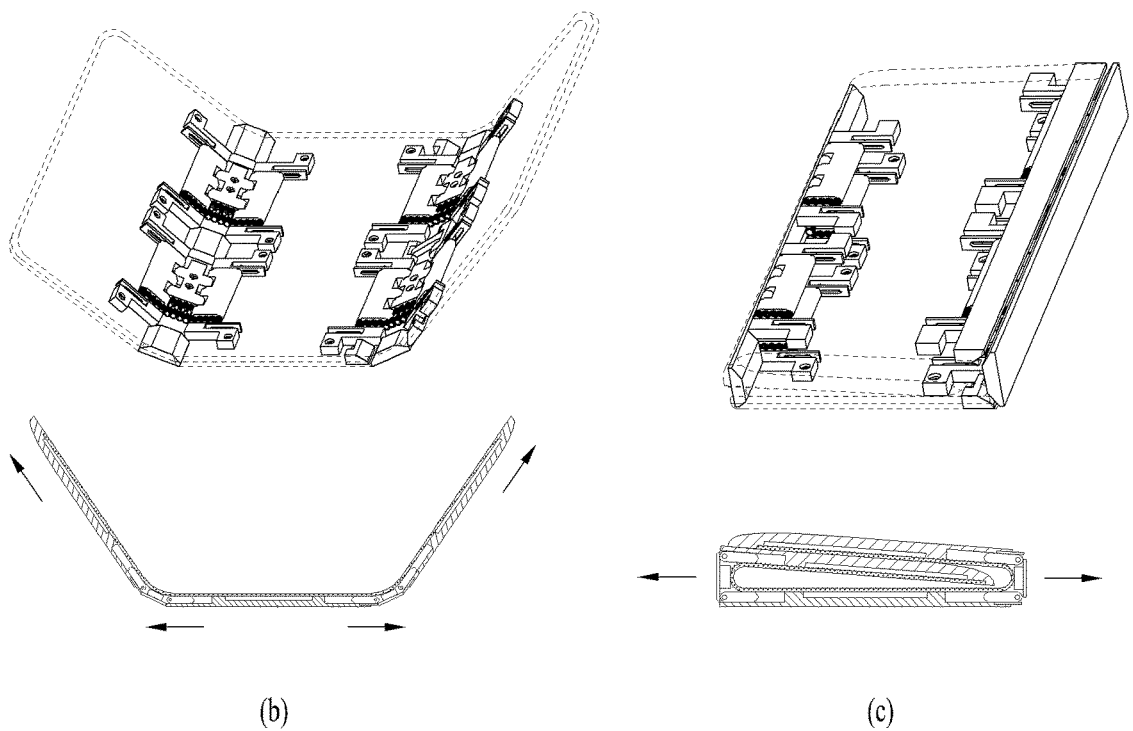
(b)                                    (c)

MOBILE TERMINAL

CROSS REFERENCE TO RELATED APPLICATIONS

This application is the National Stage filing under 35 U.S.C. 371 of International Application No. PCT/KR2019/005512, filed on May 8, 2019, which claims the benefit of U.S. Provisional Application No. 62/820,836, filed on Mar. 19, 2019, the contents of which are all hereby incorporated by reference herein in their entirety.

TECHNICAL FIELD

The present disclosure relates to a mobile terminal. More specifically, the present disclosure relates to a foldable mobile terminal applicable a hinge capable of compensating for the length of a flexible display in a folded state and supporting the flexible display in an unfolded state.

BACKGROUND ART

Terminals may be divided into a mobile/portable terminal and a stationary terminal by mobility. The mobile terminal may be divided again into a handheld terminal and a vehicle mounted terminal according to whether users can carry the terminal by themselves.

The functions of mobile terminals are diversifying. For example, the functions include data and voice communication, photo and video capture through a camera, voice recording, music file playback through a speaker system, and outputting of images or videos to a display. Some terminals additionally have a gaming function or perform a multimedia player function. In particular, recent mobile terminals are capable of receiving multicast signals that provide broadcast and visual content such as video or television programs.

As terminal functions are diversified as described above, terminals are implemented in the form of a multimedia player equipped with multiple functions including, for example, photo or video capture, playing of music or video files, and reception of gaming broadcasts.

In order to support and enhance the functions of the terminal, the structural part and/or the software part of the terminal may be improved.

The mobile terminal are designed in a limited size in consideration of portability. As the size of the mobile terminal is limited, it may be difficult to provide a wide screen for the user through a display provided in the mobile terminal. Accordingly, the recent trend has been to develop foldable mobile terminals to provide a larger screen to the user while enhancing the portability of the mobile terminals.

However, for the foldable mobile terminal, compensating for the length of the flexible display panel in the folding process may be a challenge. If the length of the flexible display panel is not compensated for, the flexible display panel may be wrinkled when the foldable mobile terminal is folded.

Further, when the foldable mobile terminal in an unfolded state, sufficiently supporting the flexible display panel may be a challenge. A space may be provided around a folded portion to compensate for the length of the flexible display panel. However, in this case, a region of the flexible display panel corresponding to the space may be easily damaged in the unfolded state of the foldable mobile terminal.

DISCLOSURE

Technical Problem

An object of the present disclosure devised to solve the problem is to provide a hinge capable of compensating for the length of the flexible display panel in a folded state of a foldable mobile terminal and sufficiently supporting a flexible display panel in an unfolded state.

Technical Solution

To achieve the above and other objects of the present disclosure and in accordance with one aspect of the disclosure, a mobile terminal may include a flexible display panel including a first region, a second region, and a third region arranged between the first region and the second region, a first body configured to support the first region, a second body configured to support the second region, and a hinge module configured to support the third region, wherein the first body and the second body being rotatably connected to hinge module, wherein the hinge module includes a hinge body including a first shaft and a second shaft on both sides thereof, a first hinge connector pivoting on the first shaft and connected to the first body, and a second hinge connector pivoting on the second shaft and connected to the second body, wherein a distance of the first body to the first shaft varies according to an rotation angle of the first hinge connector, and a distance of the second body to the second shaft varies according to a rotation angle of the second hinge connector.

According to one aspect of the present disclosure, the first hinge connector and the second hinge connector rotate the same angle around the first shaft and the second shaft in opposite directions through a plurality of first gear groups operatively engaged with each other.

According to one aspect of the present disclosure, the first body may include a first rack to be engaged with a first pinion rotating according to a rotation angle of the first hinge connector, wherein a distance of the first rack to the first shaft varies, and the second body may include a second rack to be engaged with a second pinion rotating according to a rotation angle of the second hinge connector, wherein a distance of the second rack to the second shaft varies.

According to one aspect of the present disclosure, the first pinion and the second pinion may be arranged on one side surface of the first hinge connector and one side surface of the second hinge connector, respectively, and rotate the same angle in opposite directions through a plurality of second gear groups operatively engaged with each other, wherein a part of the second gear groups may be provided on shafts of a first gear group to rotate according to rotation of the first gear group.

According to one aspect of the present disclosure, the first body may include a first guide including a guide groove to receive a first protrusion protruding from one side surface of the first hinge connector and inserted thereinto, and the second body may include a second guide including a guide groove to receive a second protrusion protruding from one side surface of the second hinge connector and inserted thereinto.

According to one aspect of the present disclosure, each of the first protrusion and the second protrusion may include a polygonal cross section with respect to a protruding direction thereof so as not to rotate when inserted into the guide groove.

According to one aspect of the present disclosure, when the flexible display panel forms one flat surface, the first guide and the second guide may include front surfaces arranged in the same plane as a front surface of the hinge module to support the third region.

According to one aspect of the present disclosure, when the flexible display panel forms the one flat surface, the first guide and the second guide may contact each other to support the third region.

According to one aspect of the present disclosure, the first body may include a first hinge cover extending toward the hinge module, and the second body may include a second hinge cover extending toward the hinge module, wherein, when the flexible display panel forms one flat surface, the first hinge cover and the second hinge cover may contact each other to shield the hinge module from an outside.

According to one aspect of the present disclosure, the hinge module further may include a hinge body shield arranged on a rear surface of the hinge body, wherein the hinge body shield may include a central sidewall extending along the two shafts and protruding toward the flexible display panel.

According to one aspect of the present disclosure, when the flexible display panel forms one flat surface, the central sidewall may include a front surface arranged in the same plane as a front surface of the hinge body to support the third region.

According to one aspect of the present disclosure, the hinge module further may include a first hinge connector shield provided on a rear surface of the first hinge connector, and a second hinge connector shield provided on a rear surface of the second hinge connector, wherein the first hinge connector shield and the second hinge connector shield may include a first sidewall and a second sidewall extending along the two shafts and protruding toward the flexible display panel, respectively.

According to one aspect of the present disclosure, when the flexible display panel forms one flat surface, the first sidewall and the second sidewall may include front surfaces arranged in the same plane as front surfaces of the first hinge connector and the second hinge connector to support the third region.

According to one aspect of the present disclosure, the first sidewall may include a first slope and the second sidewall may include a second slope, wherein the first slope and the second slope may be arranged on both sides of the central sidewall and inclined toward the central sidewall, wherein the central sidewall may include a third slope and a fourth slope inclined toward the first sidewall or the second sidewall, the third slope and the fourth slope corresponding to the first slope or the second slope.

According to one aspect of the present disclosure, the first region and the third region of the flexible display panel may be arranged on both sides of the second region, wherein the second body may be connected to each of the first bodies arranged on both sides through the hinge module.

According to one aspect of the present disclosure, in an unfolded state of the mobile terminal, the first bodies on both sides of the second body may be arranged in the same plane, wherein, in a folded state of the mobile terminal, the first body arranged on one side of the second body may overlap the first body arranged on an opposite side of the second body.

According to one aspect of the present disclosure, the hinge body of the hinge module provided on the opposite side of the second body may have a wider width than the hinge body of the hinge module provided on the one side of the second body.

According to one aspect of the present disclosure, the hinge module provided on the one side of the second body may include a hinge body shield extending on a rear surface of the hinge body along the first shaft, and the hinge module provided on the opposite side of the second body may include a hinge body shield, a first hinge connector shield extending on a rear surface of the first hinge connector along the first shaft, and a second hinge connector shield extending on a rear surface of the second hinge connector along the first shaft.

Advantageous Effects

A mobile terminal according to the present disclosure may have the following effects.

The present disclosure may provide a hinge for compensating for the length to prevent the flexible display panel from being wrinkled in a folded state of foldable mobile terminal.

The present disclosure may provide a hinge for supporting a flexible display in an unfolded state of the foldable mobile terminal.

Further scope of applicability of the present disclosure will become apparent from the following detailed description. Various changes and modifications within the spirit and scope of the present disclosure can be clearly understood by those skilled in the art, and therefore it is to be understood that the detailed description and specific embodiments such as preferred embodiments of the present invention are given by way of example only.

DESCRIPTION OF DRAWINGS

FIGS. 2 to 4 are views illustrating a structure for compensating for a length of a flexible display panel in a conventional foldable mobile terminal.

FIGS. 5 and 6 are conceptual views illustrating a method of compensating for the length of a flexible display panel 410 in a foldable mobile terminal according to an embodiment of the present disclosure.

FIG. 10 is a view illustrating a folded state and an unfolded state of a foldable mobile terminal according to an embodiment of the present disclosure.

FIG. 11 is a schematic cross-sectional view of the foldable mobile terminal of FIG. 10, taken along line A-A'.

FIGS. 14 and 15 are views illustrating the operation of a hinge module 500 according to a folding angle of a mobile terminal according to an embodiment of the present disclosure.

MODE FOR DISCLOSURE

Figure 1A:
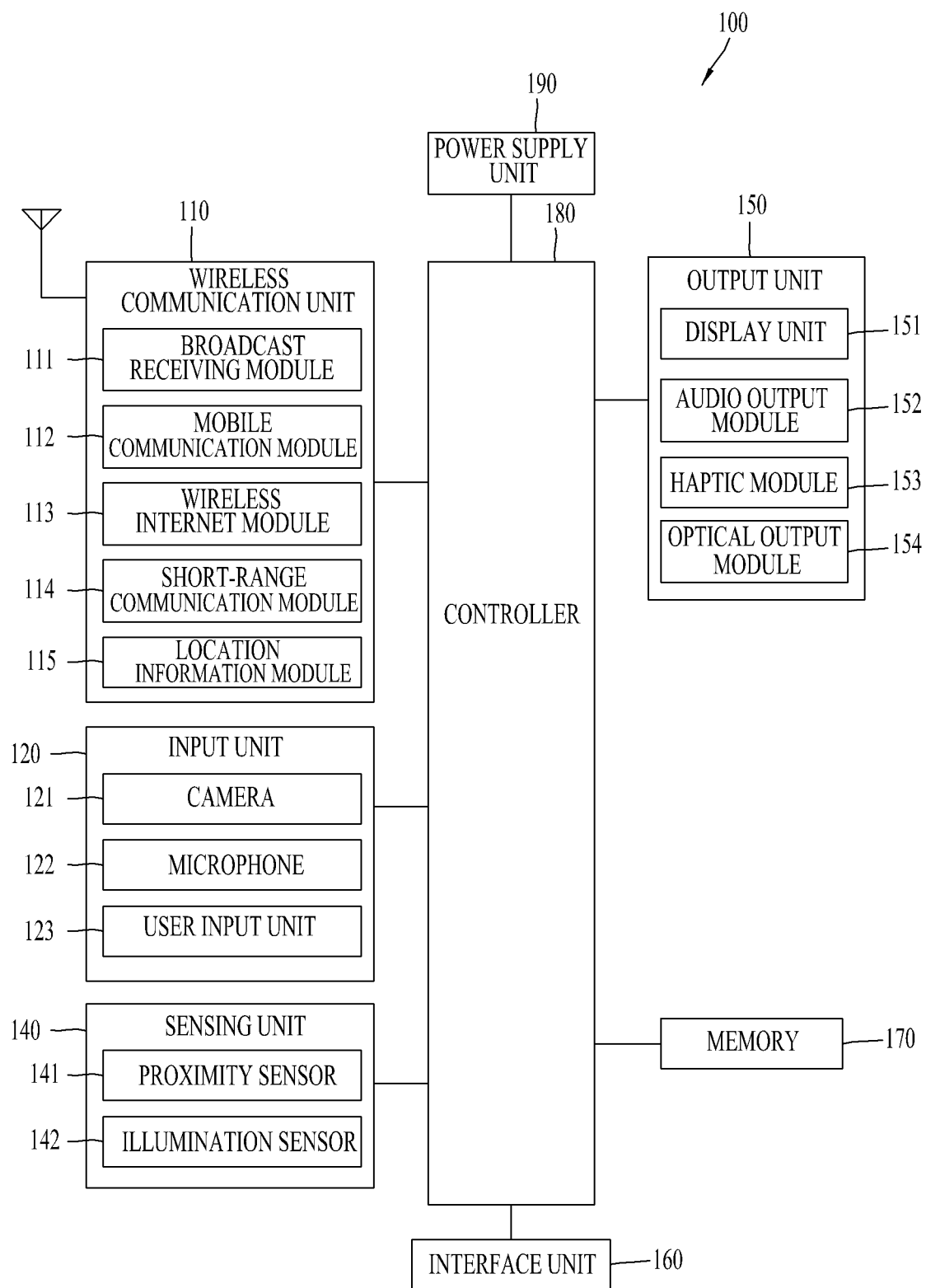
FIG. 1A is a block diagram illustrating a mobile terminal related to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
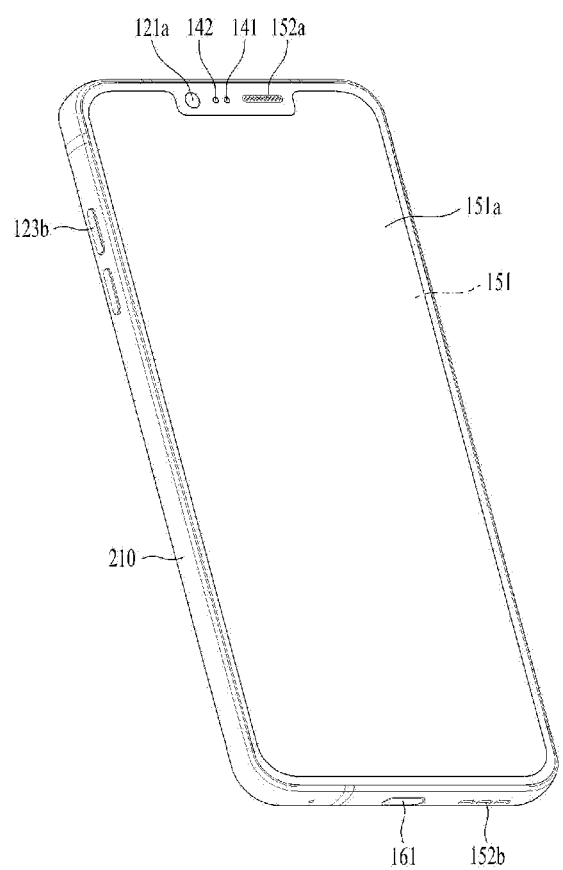
FIGS. 1B and 1C are conceptual views of an example of the mobile terminal related to the present disclosure viewed in different directions.
Figure 1C:
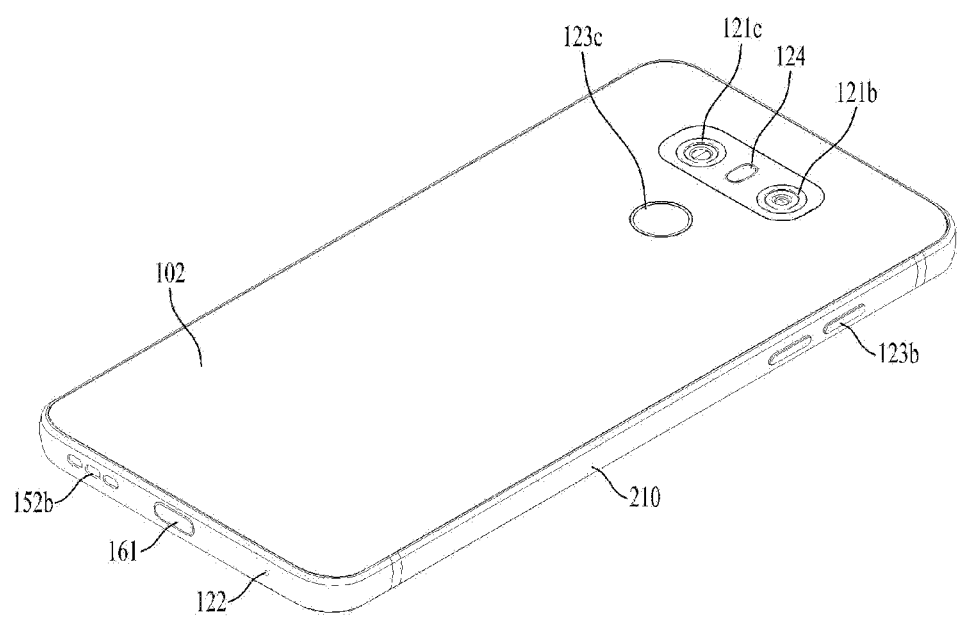

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1A, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 may control the mobile terminal 100 to execute different operations or process different data according to whether a touch with respect to a point on the touch screen is either a proximity touch or a contact touch.

A touch sensor may sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180.

Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 may receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 may store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood as a concept referring to the mobile terminal 100 viewed as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

As shown in the figures, recently, a mobile terminal having a structure in which a window 151a located on the front of the display covers the entire front while omitting the front case has been released. The terminal may have a side case 210 that surrounds the lateral perimeter. The window 151a, the side case 210 and the rear case 102 defines an inner space. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first and second audio output modules 152a and 152b, the proximity sensor 141, the illuminance sensor 142, the optical output module 154, the first and second cameras 121a and 121b, the first and second manipulation units 123a and 123b, the microphone 122 and the interface unit 160.

It will be described for the mobile terminal as shown in FIGS. 1B and 1C. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which may implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which may be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 may be configured to output light for indicating an event generation. Examples of such events include a message reception, a call signal reception, a missed call, an alarm, a schedule notice, an email reception, information reception through an application, and the like. When a user has checked a generated event, the controller may control the optical output unit 154 to stop the light output.

The first camera 121a may process image frames such as still or moving images obtained by the image sensor in a capture mode or a video call mode. The processed image frames may then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit may be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user may easily manipulate it using a forefinger when the user grabs the terminal body with one hand. Alternatively, the rear input unit may be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 may have a larger screen.

As a further alternative, the mobile terminal 100 may include a finger scan sensor which scans a user's fingerprint. The controller 180 may then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b may include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b may be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna constituting a part of the broadcast receiving module 111 (see FIG. 1A) may be configured to be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 may be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 may also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related to a control method that may be implemented in the mobile terminal configured as described above will be described with reference to the accompanying drawings. It is apparent to those skilled in the art that the present disclosure may be embodied in other specific forms without departing from the spirit and scope of the present disclosure.

Figure 2:
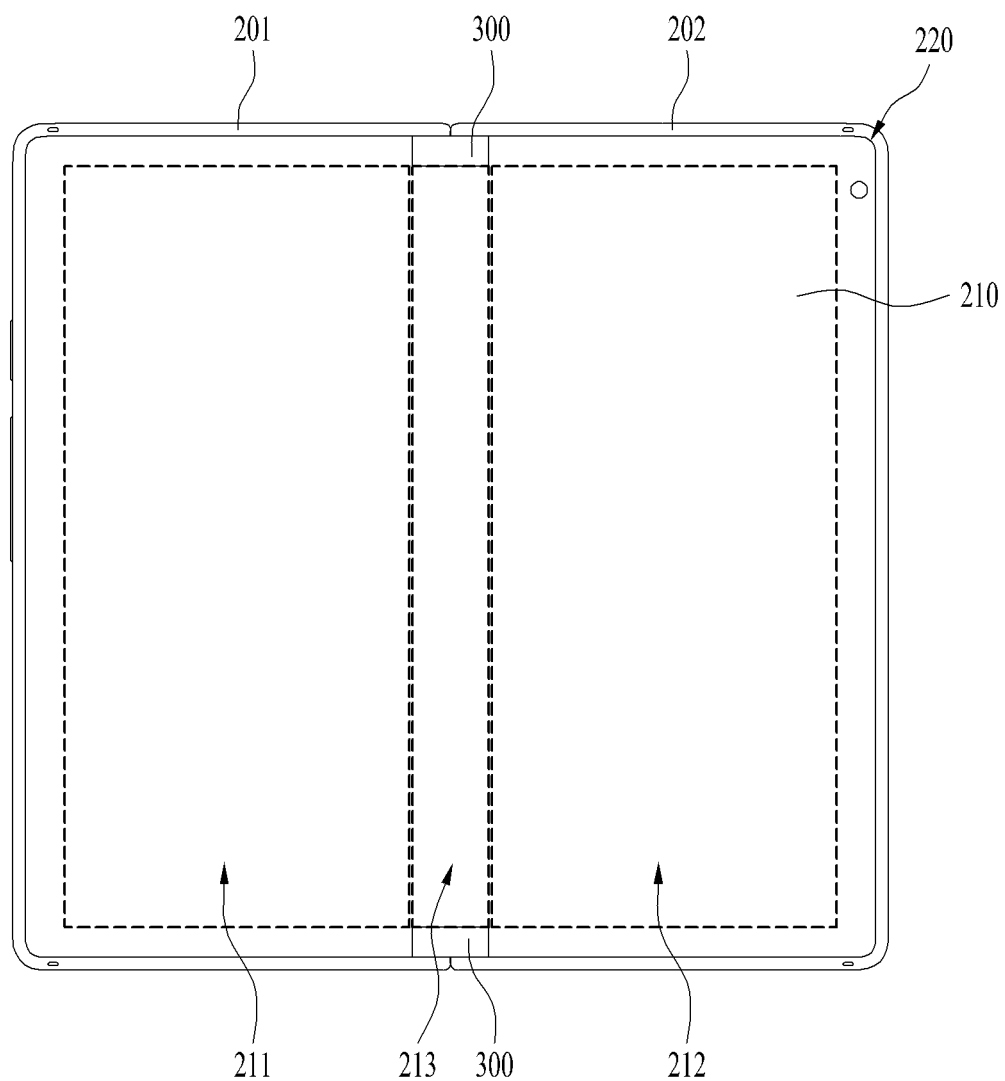
Figure 3:
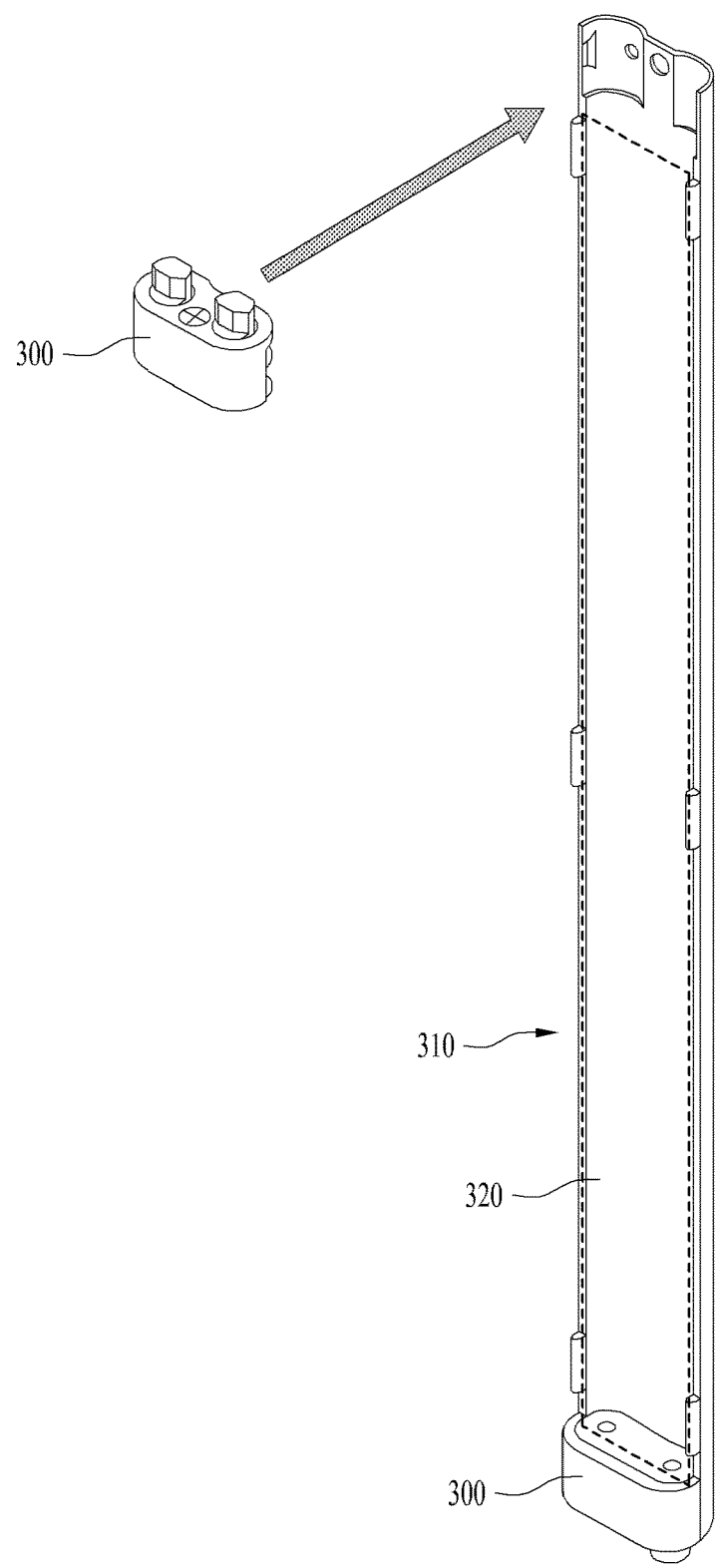

FIGS. 2 to 4 are views illustrating a structure for compensating for a length of a flexible display panel in a conventional foldable mobile terminal. Hereinafter, it is assumed that the mobile terminal 100 is a foldable mobile terminal provided whose body of two regions defines the overall appearance and is allowed to be repeatedly unfolded and folded.

As shown in FIG. 2, the mobile terminal 100 may have a first body 201 and a second body 202, which may be connected by a hinge 300 for a folding mechanism. A flexible display panel 210 may be provided on one surface of the first body 201 and the second body 202. Specifically, the flexible display panel 210 may include a first region 211 supported by the first body 201, a second region 212 supported by the second body 202, and a third area 213 provided between the first region 211 and the second region 212. The third region 213 may be an area corresponding to the hinge 300 and form a curvature corresponding to the folding mechanism of the mobile terminal 100. The first region 211 and the second region 212 may be areas that maintain a flat state regardless of the folding mechanism of the mobile terminal 100.

When the flexible display panel 210 is folded while being fixed to the first body 201 and the second body 202, the length thereof should be compensated for. The length compensation is intended to prevent the flexible display panel 210 from being wrinkled when the first body 201 and the second body 202 are folded. When the mobile terminal 100 is folded, the flexible display panel 210 may be wrinkled for the following reason. The straight length of the first body 201 and the second body 202 on the surface on which the flexible display panel 210 is provided is variable between the unfolded state and the folded state. The straight length is a length of a straight line segment connecting a first point on the surface provided with the flexible display panel 210 in the first body 201 and a second point on the surface provided with the flexible display panel 210 in the second body 201. The straight length is shorter in the folded state than in the unfolded state of the mobile terminal 100. Accordingly, if the length of the flexible display panel 210 is not compensated for, the flexible display panel 210 may be wrinkled in the folded state of the mobile terminal 100.

In order to compensate for the length of the flexible display panel 210, a space 320 may be provided in the folding region as shown in FIG. 3. The hinge 300 may be provided on both sides of a hinge frame 310 with the space 320 interposed therebetween.

Specifically, FIG. 3 shows a hinge module including the hinge 300 of the mobile terminal of FIG. 2. FIG. 4 is a conceptual view illustrating a method of compensating for the length of the flexible display panel 210 through the hinge module of FIG. 3.

Specifically, FIG. 4-(a) shows the mobile terminal 100 in an unfolded state. When the mobile terminal 100 is in the unfolded state, the third region 213 of the flexible display panel 210 is hung over the space 320. FIG. 4-(b) shows the mobile terminal 100 in a folded state. When the mobile terminal 100 is in the folded state, the third region 213 of the flexible display panel 210 is inserted into the space 320 to compensate for the length.

The structure for compensating for the length of the flexible display panel 210 shown in FIGS. 2 and 3 may involve the following issues. First, the third region 213 of the flexible display panel 213 is not supported in the unfolded state of the mobile terminal 100. Specifically, when the mobile terminal 100 is in the unfolded state, the third region 213 of the flexible display panel 213 is hung over the space 213. Accordingly, the third region 213 may be deformed when touched by a user in the unfolded state of the mobile terminal 100. In addition, since the third region 213 is not supported in the unfolded state of the mobile terminal 100, it remains wrinkled. Second, as the hinges 300 are provided on both sides of the flexible display panel 300, the bezel 220 is thickened. This is because arranging the hinges 300 on both sides of the flexible display panel 300 is required to form the space 230 on the rear surface to compensate for the length of the flexible display panel 300. Third, the hinge 300 may not be strong enough to support the folding mechanism of the first body 201 and the second body 202. To prevent the bezel 200 from being thickened, the size of the hinge 300 should be limited, which may deteriorate the durability of the hinge 300. In addition, as the hinge is arranged to connect the corner portions of the first body 201 and the second body 202, it may be easily damaged by torsion.

In order to address the above-described issues, the present disclosure proposes a structure in which the hinge 300 is arranged on the rear surface of the flexible display panel 210 to sufficiently support the third region in the unfolded state of the mobile terminal 100 and compensate for the length of the flexible display panel 210.

FIGS. 5 and 6 are conceptual views illustrating a method of compensating for the length of a flexible display panel 410 in a foldable mobile terminal according to an embodiment of the present disclosure.

The present disclosure proposes a structure in which a hinge module 500 is arranged on a rear surface of a flexible display panel 410 in a mobile terminal, and the hinge module 500 moves (or a first body 401 and a second body 402 move with respect to the hinge module 500) to compensate for the length of the flexible display panel 410 when the mobile terminal is folded.

As an example, FIG. 5 shows an embodiment in which the hinge module 500 moves along a first guide 4012 and a second guide 4022, which are provided to the first body 401 and the second body 402, respectively.

FIG. 5-(a) is a schematic view of the mobile terminal in the unfolded state. In the flexible display panel 410, a first region 411 may be provided on one surface of the first body 401, a second region 412 may be provided on the second body 402, and a third region 413 may be provided between the first region 411 and the second region 412. The first body 401 and the second body may be connected by the hinge module 500. The hinge 500 may include two shafts 511 and 521 around which the first body 401 and the second body 502 rotate. That is, the first body 401 may rotate around the first shaft 511 of the hinge 500, and the second body 402 may rotate around the second shaft 521 of the hinge 500. In this operation, the first shaft 511 may move along the first guide 4012, and the second shaft 521 may move along the second guide 4022.

Specifically, FIG. 5-(b) is a conceptual view showing the mobile terminal in the folded state. In the embodiment shown in the figure, the first shaft 511 moves from one end of the first guide 4012 to an opposite end thereof, and the second shaft 521 moves from one end of the second guide 4022 to an opposite end thereof. That is, when the mobile terminal is folded, the first body 401 may move away from the first shaft 511 to compensate for the length of the flexible display panel 410. Similarly, when the mobile terminal is folded, the second body 402 may move away from the second shaft 521 to compensate for the length of the flexible display panel 410. Here, the movement of the first body 401 away from the first shaft 511 may be understood as movement of the first shaft 511 toward the edge of the first body 401. Similarly, the movement of the second body 402 away from the second shaft 521 may be understood as movement of the second shaft 521 toward the edge of the second body 402. As a result, in FIG. 5-(b), the hinge module 500 may move along the guides 4012 and 4022 in a direction opposite to the side on which the flexible display panel 410 is provided, thereby compensating for the length of the flexible display panel 410.

As another example, FIG. 6 shows an embodiment in which the hinge module 500 moves along a first rack 4012 and a second rack 4022 provided to the first body 401 and the second body 402, respectively.

FIG. 6-(a) is a schematic view of the mobile terminal in the unfolded state. In the flexible display panel 410, a first region 411 may be provided on one surface of the first body 401, a second region 412 may be provided on the second body 402, and a third region 413 may be provided between the first region 411 and the second region 412. The first body 401 and the second body may be connected by the hinge module 500. The hinge 500 may include two shafts 511 and 521 around which the first body 401 and the second body 502 rotate. That is, the first body 401 may rotate around the first shaft 511, and the second body 402 may rotate around the second shaft 521. A first pinion 512 may rotate about the first shaft 511 so as to be engaged with the first rack 4011. A second pinion 522 may rotate about the second shaft 521 so as to be engaged with the second rack 4021.

Specifically, FIG. 6-(b) is a conceptual view showing the mobile terminal in the folded state. As the first pinion 512 rotates in engagement with the first rack 4011, the first body 401 may move away from the first shaft 511. Also, as the second pinion 522 rotates while in engagement with the second rack 4021, the second body 402 may move away from the second shaft 521. Here, the movement of the first body 401 away from the first shaft 511 may be understood as movement of the first shaft 511 toward the edge of the first body 401. Similarly, the movement of the second body 402 away from the second shaft 521 may be understood as movement of the second shaft 521 toward the edge of the second body 402. As a result, in FIG. 6-(b), the hinge module 500 may move along the racks 4011 and 4021 in a direction opposite to the side on which the flexible display panel 410 is provided, thereby compensating for the length of the flexible display panel 410.

The mobile terminal may include a hinge module 500 corresponding to the embodiment of FIG. 5 or may include a hinge module 500 corresponding to the embodiment of FIG. 6. In some embodiments, it may include the hinge module 500 to include both the embodiments of FIGS. 5 and 6. Hereinafter, a detailed structure of the present disclosure will be described.

Figure 7:
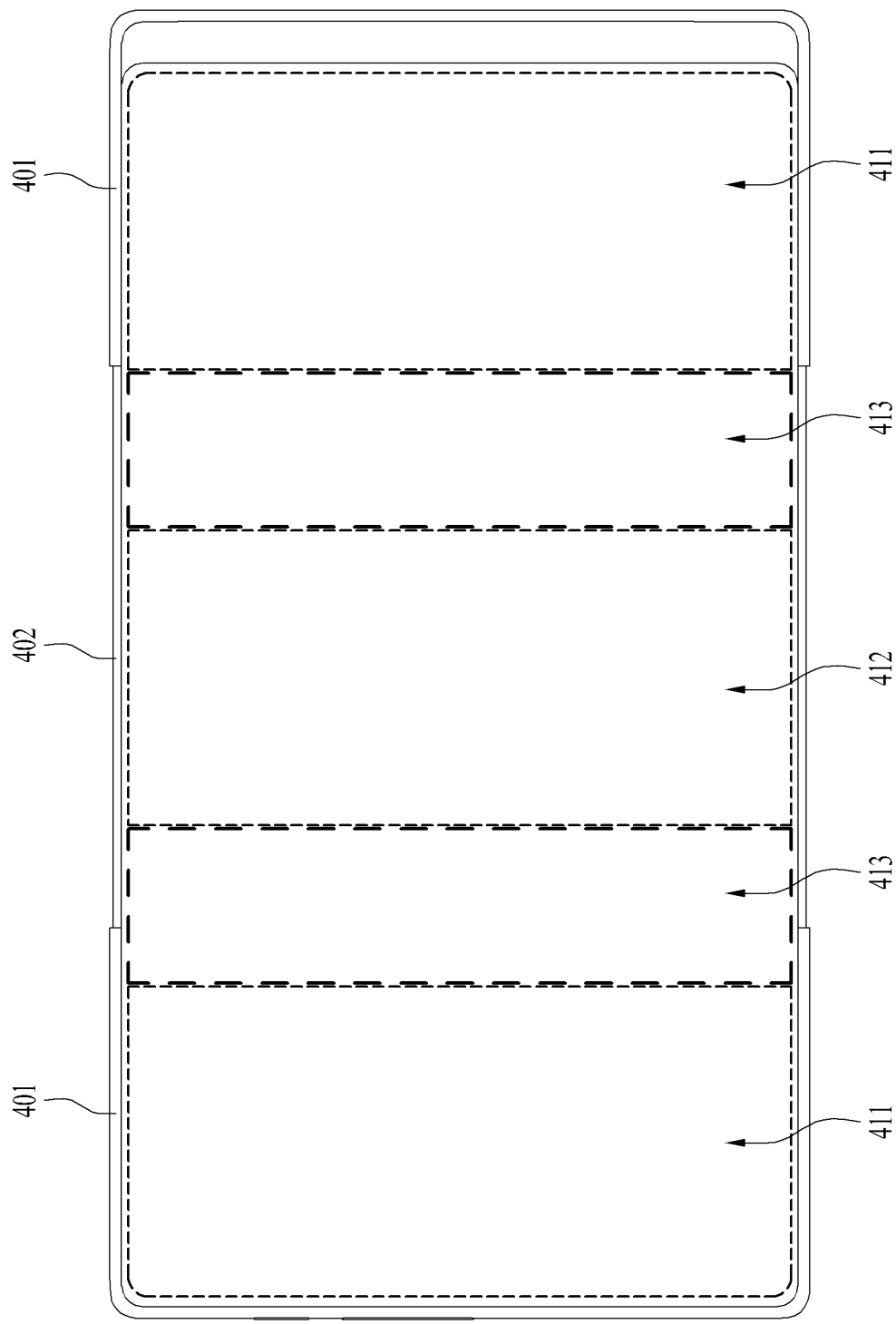
FIG. 7 is a front view of a foldable mobile terminal according to an embodiment of the present disclosure.
Figure 8:
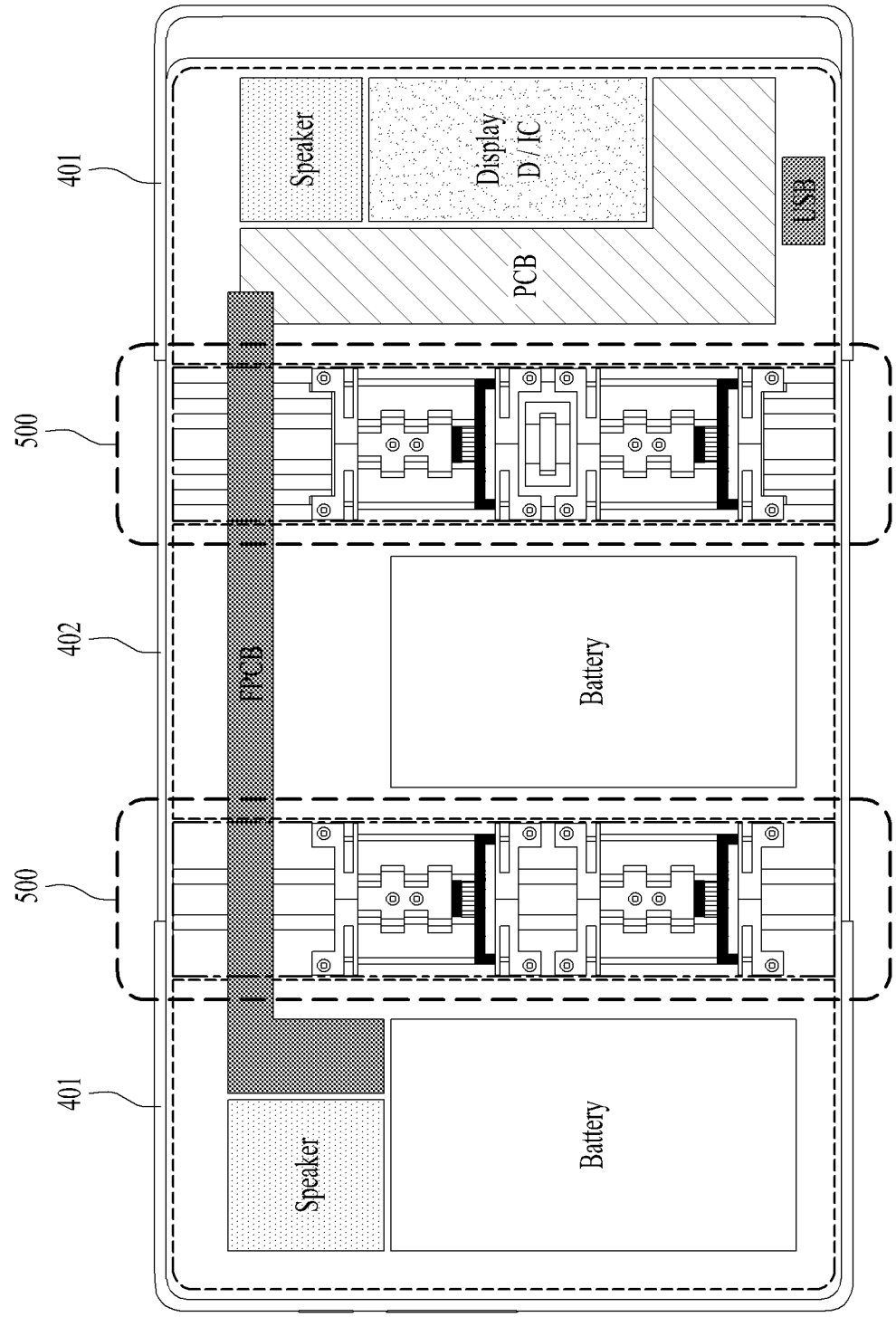
FIG. 8 is a view illustrating an arrangement of internal components of the foldable mobile terminal according to an embodiment of the present disclosure.
Figure 9:
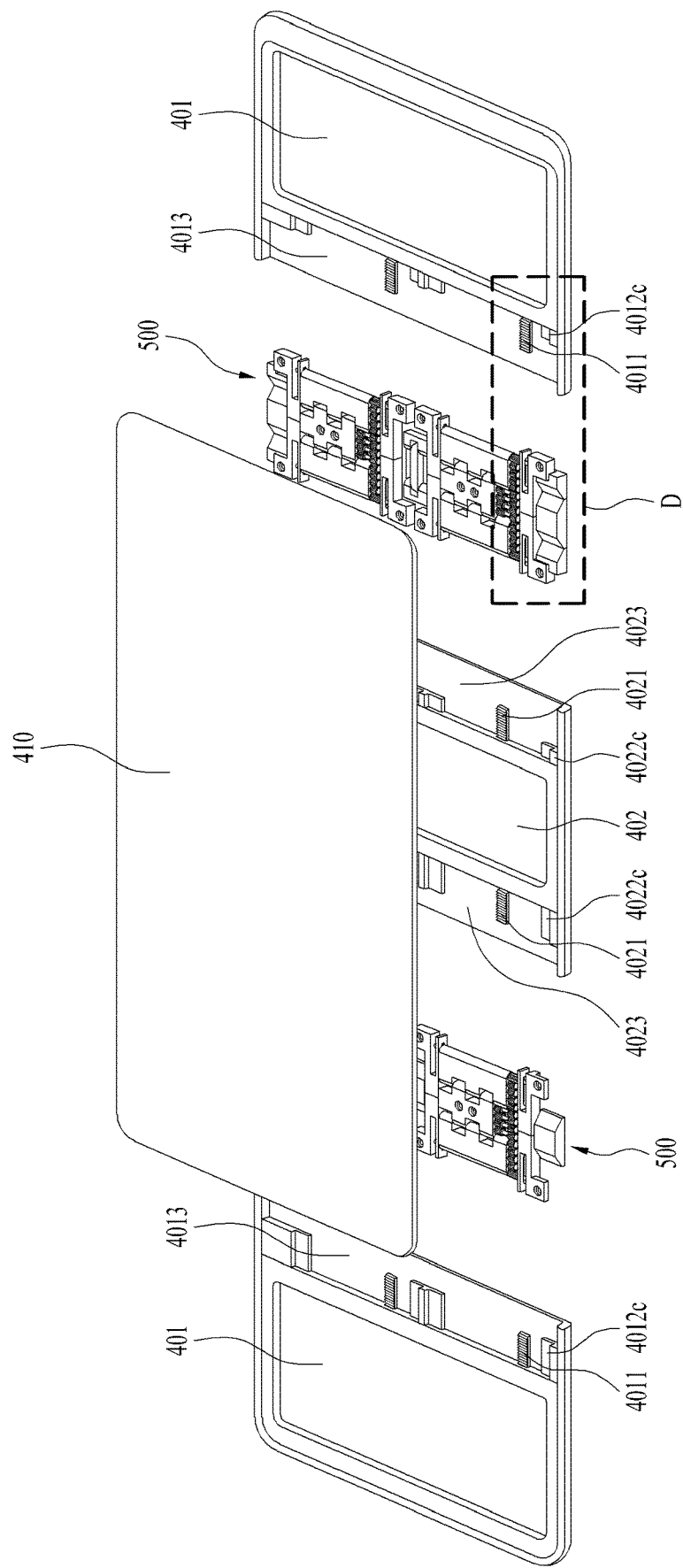
FIG. 9 is an exploded view showing some components of the foldable mobile terminal according to an embodiment of the present disclosure.

FIG. 7 is a front view of a foldable mobile terminal 100 according to an embodiment of the present disclosure. FIG. 8 is a view illustrating an arrangement of internal components of the foldable mobile terminal according to an embodiment of the present disclosure. FIG. 9 is an exploded view showing some components of the foldable mobile terminal according to an embodiment of the present disclosure.

The mobile terminal 100 according to the present disclosure may include a flexible display panel 410 including a first region 411, a second region 412, and a third region 413 disposed between the first region 411 and the second region 412. The first region 411 may be supported by the first body 411, and the second region 412 may be supported by the second body 402. The first body 401 and the second body 402 may be connected by the hinge module 500 to carry out a folding mechanism. The hinge module 500, to which the first body 401 and the second body 402 may be rotatably connected, may be configured to support the third region 413.

The mobile terminal according to the present disclosure may be a multi-foldable mobile terminal. The multi-foldable mobile terminal refers to a mobile terminal having at least two hinge modules 500. The multi-foldable mobile terminal refers to a mobile terminal in which at least three bodies are connected through the hinge modules 500. Specifically, FIGS. 7 to 9 show a multi-foldable mobile terminal. The foldable mobile terminal is folded and unfolded like a book basically using a single hinge module 500, and the present disclosure is not limited to the multi-foldable mobile terminal.

In the multi-foldable mobile terminal, the flexible display panel 410 may include the first region 411, the third region 413, and the second region 412 arranged therebetween, and the first bodies 401 and the hinge modules 500 may be arranged on both sides of the second body 402. The hinge modules 500 arranged on both sides of the second body 402 may be different from each other in terms of a radius of curvature formed when the flexible display panel 410 is folded.

FIG. 10 is a view illustrating a folded state and an unfolded state of a foldable mobile terminal according to an embodiment of the present disclosure.

Specifically, FIG. 10-(a) illustrates a fully unfolded state of the mobile terminal. The fully unfolded state of the mobile terminal is a state in which the flexible display panel 410 forms one flat surface, and the curvature formed by the flexible display panel 410 is infinite. The first body 401 of the mobile terminal may extend to both sides of the second body 402 to support the flexible display panel 410 together with the second body.

FIG. 10-(b) illustrates a partially folded state of the mobile terminal. Specifically, the first body 401 on one side of the second body 402 is folded, and the first body 401 on the opposite side is in an unfolded state. In this case, the hinge module 500 on one side may perform the function of compensating for the length of the flexible display panel 410.

FIG. 10-(c) illustrates a fully folded state of the mobile terminal. Specifically, the first bodies 401 arranged on both sides of the second body 402 are in the folded state. In this case, the hinge modules 500 on both sides may perform the function of compensating for the length of the flexible display panel 410.

FIG. 11 is a schematic cross-sectional view of the foldable mobile terminal of FIG. 10, taken along line A-A'. FIG. 11 illustrates a schematic configuration of the hinge modules 500 and a mechanism of the hinge modules 500 for compensation for the length of the flexible display panel 410.

The hinge module 500 may include a hinge body 530 including a first shaft 511 and a second shaft 521 provided on both sides thereof, a first hinge connector 510 pivoting on the first shaft 511 and connected to the first body 401, a second hinge connector 520 pivoting on the second shaft 521 and connected to the second body 402.

In order to compensate for the length of the flexible display panel 410, the hinge module 500 may move according to the rotation angle of the first hinge connector 510 and the second hinge connector 520 in a direction opposite to the side on which the flexible display panel 410 is provided. Specifically, the distance of the first body 401 to the first shaft 511 may vary according to the rotation angle of the first hinge connector 510. Also, the distance of the second body 402 to the second shaft 521 may vary according to the rotation angle of the second hinge connector 520. Here, the movement of the first body 401 moves away from the first shaft 511 may be understood as movement of the first shaft 511 toward the edge of the first body 401. Similarly, the movement of the second body 402 away from the second shaft 521 may be understood as movement of the second shaft 521 toward the edge of the second body 402.

FIG. 11-(a) illustrates the mobile terminal in the fully unfolded state. In this case, the flexible display panel 410 may form one flat surface. That is, when the mobile terminal is fully unfolded, the flexible display panel 410 may have an infinite radius of curvature. The first region 411 of the flexible display panel 410 may be supported by the first body 401. In some embodiments, it may be supported by an internal component accommodated in the first body 401. The second region 412 of the flexible display panel 410 may be supported by the second body 402. In some embodiments, it may be supported by an internal component accommodated in the second body 402. The third region 413 between the first region 411 and the second region 412 may be supported by the hinge module 500. In order to more stably support the third region 413 with the hinge module 500, when the flexible display panel 410 forms one flat surface, the front surfaces of the hinge body 530, the first hinge connector 510 and the second hinge connector 520 may be arranged in the same plane.

FIG. 11-(b) illustrates a state in which a part of the mobile terminal is folded. Specifically, FIG. 11-(b) illustrates an embodiment in which the first body 401 arranged on one side of the second body 402 is folded. In this case, the hinge module 500 provided on one side may move in a direction B opposite to the side on which the flexible display panel 410 is provided, thereby compensating for the length of the flexible display panel 410. Specifically, with respect to the hinge module 500 provided on one side, a length h1 between the first body 401 and the first shaft 511 is farther away, and a length h2 between the second body 402 and the second shaft 521 is farther away.

FIG. 11-(c) illustrates the mobile terminal in the fully folded state. Specifically, FIG. 11-(c) illustrates an embodiment in which the first bodies 401 provided on both sides of the second body 402 are folded. In this case, the hinge module 500 provided on one side may move in the direction B opposite to the side on which the flexible display panel 410 is arranged, thereby compensating for the length of the flexible display panel 410. Also, the hinge module 500 provided on the opposite side may move in a direction B' opposite to the side on which the flexible display panel 410 is provided, thereby compensating for the length of the flexible display panel 410. However, the hinge modules 500 may move to different degrees according to the radius of curvature (C or C') formed by the flexible display panel 410. In consideration of the degrees to which the hinge modules 500 move, the hinge modules 500 provided on both sides may include different structures.

Figure 12:
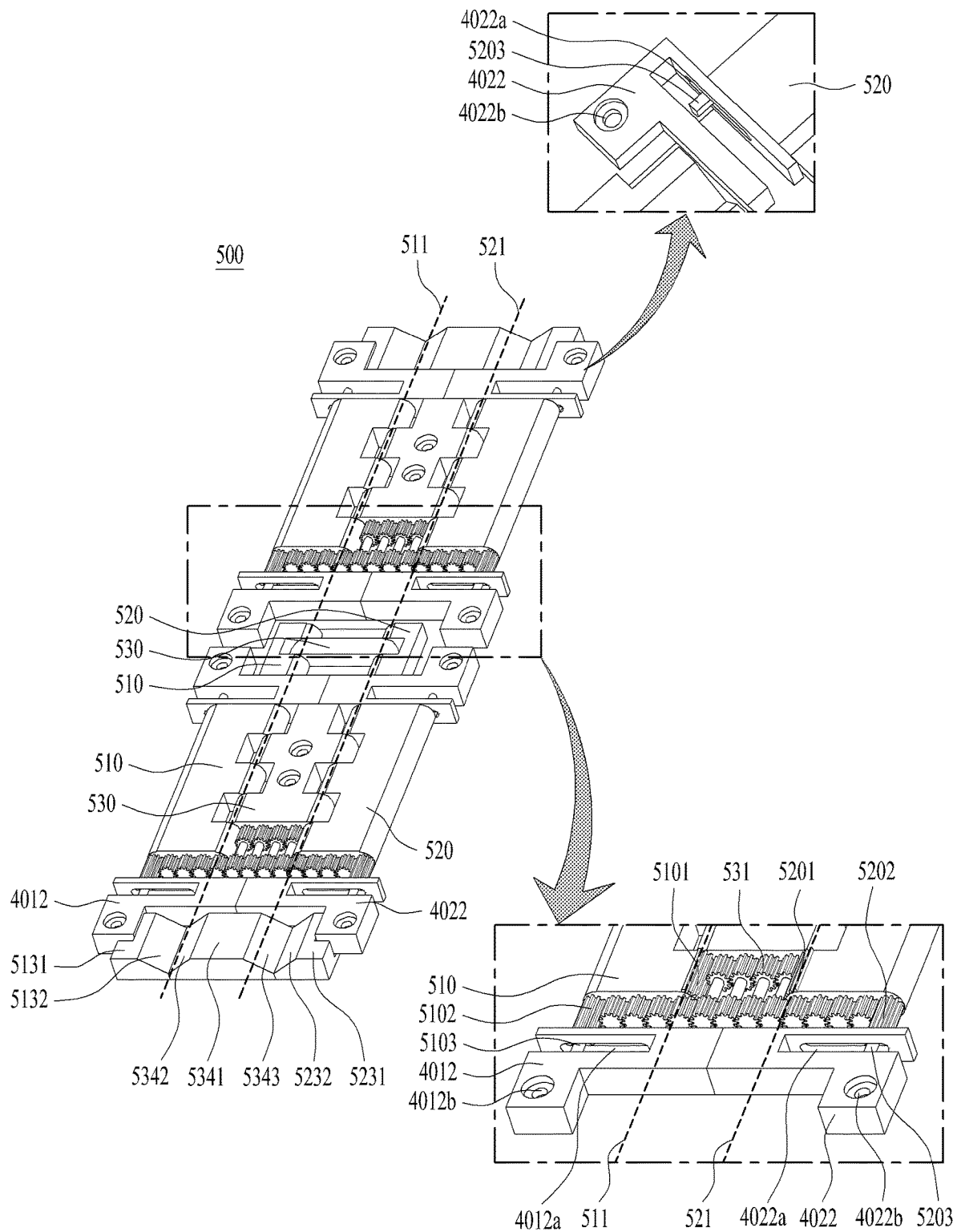
FIGS. 12 and 13 show a hinge module according to an embodiment of the present disclosure.
Figure 13:
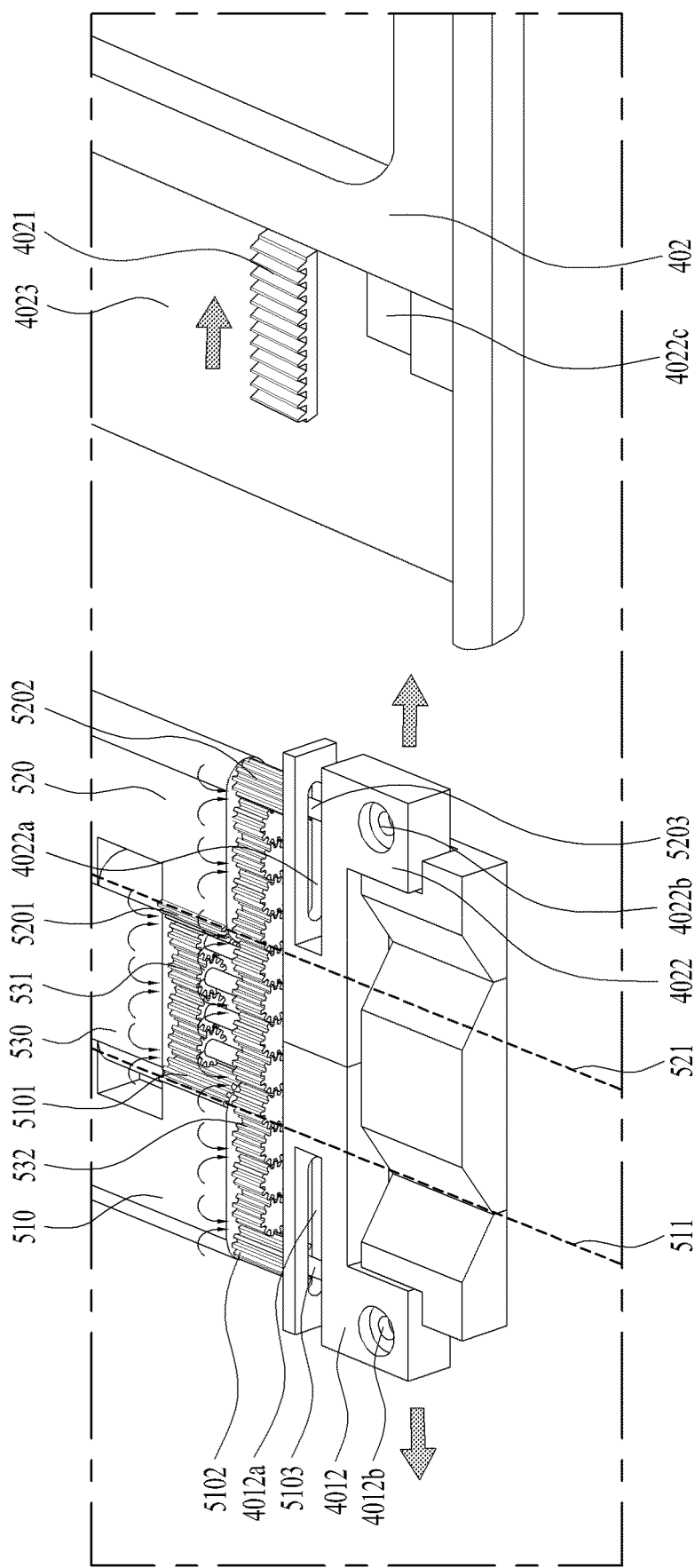

FIGS. 12 and 13 show a hinge module 500 according to an embodiment of the present disclosure. Specifically, FIG. 13 is an enlarged view of area D of FIG. 9.

The hinge module 500 includes a hinge body 530 including a first shaft 511 and a second shaft 521 on both sides thereof, a first hinge connector 510 pivoting on the first shaft 511 and connected to the first body 401, and a second hinge connector 520 pivoting on the second shaft 521 and connected to the second body 402.

The first hinge connector 510 and the second hinge connector 520 may rotate around the first shaft 511 and the second shaft 521 by the same angle in opposite directions through a plurality of first gear groups 531 engaged therewith for operation. In order to engage with the first gear groups 531, the first hinge connector 510 and the second hinge connector 520 may include toothed surfaces 5101 and 5201. The number of the plurality of first gear groups 531 may be an even number. The plurality of first gear groups 531 may be arranged on a plurality of shafts provided on one side of the hinge body 530. In some embodiments, the toothed surfaces 5101 and 5201 of the first hinge connector 510 and the second hinge connector 520 may rotate by the same angle in the opposite directions, while making a direct contact with each other without the first gear group 531. The first body 401 and the second body 402 may be connected to the first hinge connector 510 and the second hinge connector 520, respectively, to rotate by the same angle in the opposite directions. For example, when the first body 401 is connected to the first hinge connector 510 and rotates −30 degrees around the first shaft 511, the second body 402 may be connected to the second hinge connector 520 and rotate +30 degrees around the second shaft 521.

As the first body 401 connected to the first hinge connector 510 rotates around the first shaft 511, the distance thereof to the first shaft 511 may vary. As the second body 402 connected to the second hinge connector 520 rotates around the second shaft 521, there distance thereof to the second shaft 521 may vary. Here, the movement of the first body 401 away from the first shaft 511 may be understood as movement of the first shaft 511 toward the edge of the first body 401. Similarly, the movement of the second body 402 away from the second shaft 521 may be understood as movement of the second shaft 521 toward the edge of the second body 402. Specifically, the distance between the first body 401 and the first shaft 511 may be greater when the third region 413 of the flexible display panel 410 forms a curvature than when the flexible display panel 410 forms one flat surface. Also, the distance between the second body 402 and the second shaft 512 may greater when the third region 413 of the flexible display panel 410 forms a curvature than when the flexible display panel 410 forms one flat surface. That is, when the third region 413 of the flexible display panel 410 forms a curvature, the first body 401 and the second body 402 may move away from the first shaft 511 and the second shaft 512, respectively, thereby compensating for the length of the flexible display panel 410.

The distance between the first body 401 and the first shaft 511 may vary according to an angle at which the first body 401 is connected to the first hinge connector 510 and rotates around the first shaft 511. Similarly, the distance between the second body 402 and the second shaft 512 may vary according to the angle at which the second body 402 is connected to the second hinge connector 520 and rotates around the second shaft 512. For such operation, the first hinge connector 510 may include a first pinion 5102 configured to rotate according to an angle of rotation around the first shaft 511, and the first body 401 may include a first rack 4011 engaged with the first pinion 5102. The first rack 4201 may move the first body 401 in one direction or an opposite direction according to the rotation direction of the first pinion 5102. The distance of movement of the first body 401 may correspond to the rotation angle of the first pinion 5102. Similarly, the second hinge connector 520 may include a second pinion 5202 configured to rotate according to an angle of rotation around the second shaft 512, and the second body 402 may include a second rack 4021 engaged with the second pinion 5202. The second leg 4021 may move the second body 402 in one direction or an opposite direction according to the rotation direction of the second pinion 5202. The distance of movement of the second body 402 may correspond to the rotation angle of the second pinion 5202.

The first pinion 5102 may rotate according to an angle at which the first hinge connector 510 rotates around the first shaft 511. Similarly, the second pinion 5202 may rotate according to an angle at which the second hinge connector 520 rotates around the second shaft 512. Through such operations, the distance of the first body 401 to the first shaft 511 may vary according to the angle at which the first hinge connector 510 rotates around the first shaft 511. Also, the distance of the second body 402 to the second shaft 512 may vary according to the angle at which the second hinge connector 520 rotates around the second shaft 512. The first pinion 5102 may be provided on the first shaft 511 to rotate according to the angle at which the first hinge connector 510 rotates around the first shaft 511. Also, the second pinion 5202 may be provided on the second shaft 521 to rotate corresponding to the angle at which the second hinge connector 520 rotates around the second shaft 521. However, when the first pinion 5102 and the second pinion 5202 are provided on the first shaft 511 and the second shaft 521, respectively, it may be difficult to secure a distance of movement along a first guide 4012 and a second guide 4022, which are described below. Accordingly, the first pinion 5102 may be provided on one side surface of the first hinge connector 510 so as to be spaced apart from the first shaft 511, and may rotate through a plurality of second gear groups 532 according to the rotation angle of the first hinge connector 510. Similarly, the second pinion 5202 may be provided on one side surface of the second hinge connector 520 so as to be spaced apart from the second shaft 512, and may rotate through the plurality of second gear groups 532 according to the rotation angle of the second hinge connector 520. The plurality of second gear groups 532 may include a plurality of gears engaged with each other for operation, and some of the gears may be provided on the first shaft 511 and the second shaft 521. In some embodiments, some of the gears of the plurality of second gear groups 532 may be provided on the shafts of the plurality of first gear groups 531 to rotate together with the plurality of first gear groups 531. When some of the gears of the plurality of second gear groups 532 are provided on the shafts of the plurality of first gear groups 531, the rotational power of the plurality of first gear groups 531 may be transmitted to the second gear groups 532, which may be advantageous for the folding mechanism. In this case, the first pinion 5102 and the second pinion 5202 may be engaged with the plurality of second gear groups 532 to rotate in opposite directions at the same angle.

The first guide 4012 may be fixed to the first body 401 and extend toward the hinge module 500, and the first hinge connector 510 may move along the first guide 4012. In a symmetric manner, the second guide 4022 may be fixed to the second body 402 and extend toward the hinge module 500, and the second hinge connector 520 may move along the second guide 4022. Specifically, the first guide 4012 may include a first guide groove 4012a into which a first protrusion 5103 protruding from one side surface of the first hinge connector 510 is movably inserted. In addition, the first guide 4012 may be fixed to a coupling portion 4012c of the first body 401 through a first coupling groove 4012b. Similarly, the second guide 4022 may include a second guide groove 4022a into which a second protrusion 5203 protruding from one side surface of the second hinge connector 520 is movably inserted. In addition, the second guide 4022 may be fixed to a coupling portion 4022c of the second body 402 through a second coupling groove 4022b. The first protrusion 5103 and the second protrusion 5203 may extend from the shaft of the first pinion 5102 and the shaft of the second pinion 5202, respectively. The first protrusion 5103 may include a polygonal cross-section with respect to the protruding direction so as not to rotate when inserted into the first guide groove 4012a. Similarly, the second protrusion 5203 may include a polygonal cross-section with respect to the protruding direction so as not to rotate when inserted into the second guide groove 4022a.

Each of the first guide 4012 and the second guide 4022 include a front surface formed in the same plane as the hinge module 500 in order to support the third region 413 of the flexible display panel 410 when the flexible display panel 410 forms one flat surface. Specifically, the first guide 4012 and the second guide 4022 include front surfaces in the same plane as the front surface of the first hinge connector 510 and the front surface of the second hinge connector 520 when the flexible display panel 410 forms one flat surface. In addition, when the flexible display panel 410 forms one flat surface, the ends of the first guide 4012 and the second guide 4022 may be arranged in contact with each other in order to more sufficiently support the third region.

The first body 401 may include a first hinge cover 4013 extending toward the hinge module 500, and the second body 402 may include a second hinge cover 4023 extending toward the hinge module 500. When the flexible display panel 410 forms one flat surface, the first hinge cover 4013 and the second hinge cover 4023 may contact each other to prevent the hinge module 500 from being exposed to the outside.

The hinge module 500 may include a hinge body shield 5340 on the rear surface of the hinge body 530. The hinge body shield 5340 may include a central sidewall 5341 extending along the first shaft 511 and the second shaft 521 and protruding toward the flexible display panel. The hinge body shield 5340 may be exposed to the outside when the third region 413 of the flexible display panel 410 forms a curvature. The central sidewall 5341 may be exposed to the outside when the third region 413 of the flexible display panel 410 forms a curvature. In addition, the central sidewall 5314 may be configured to support the third region 413 when the flexible display panel 410 forms one flat surface. To this end, the central sidewall 5314 may include a front surface in the same plane as the hinge body 530 when the flexible display panel 410 forms one flat surface.

The hinge module 500 may include a first hinge connector shield 5130 provided on the rear surface of the first hinge connector 510 and a second hinge connector shield 5230 provided on the rear surface of the second hinge connector 520. The first hinge connector shield 5130 and the second hinge connector shield 5230 may be exposed to the outside when the third region 413 of the flexible display panel 410 forms a curvature. However, the first hinge connector shade 5130 and the second hinge connector shade 5230 may be omitted according to the curvature formed by the third region 413. Specifically, in FIG. 9, the hinge module 500 provided on the left side of the second body 402 is not provided with the first hinge connector cover 5130 and the second hinge connector cover 5230. The first hinge connector cover 5130 and the second hinge connector cover 5230 may include a first sidewall 5131 and a second sidewall 5231 extending along the first shaft 511 and the second shaft 521 and protruding toward the flexible display panel, respectively. The first sidewall 5131 and the second sidewall 5231 may include front surfaces formed in the same plane as the first hinge connector 510 and the second hinge connector 520 when the flexible display panel 410 forms one flat surface, thereby supporting the third region 413. The first sidewall 5131 may include a first slope 5132 and the second sidewall 5231 may include a second slope 5232, the first and second slopes being provided on both sides of the central sidewall 5341 and inclined toward the central sidewall 5314. Also, the central sidewall 5341 may include a third slope 5342 and a fourth slope 5343 inclined toward the first sidewall 5131 or the second sidewall 5231 and corresponding to the first slope 5132 or the second slope 5232. The first slope 5132 may face the third slope 5342 when the first hinge connector 510 rotates around the first shaft 511. Similarly, the second slope 5232 may face the fourth slope 5343 when the second hinge connector 520 rotates around the second shaft 512.

Figure 14:
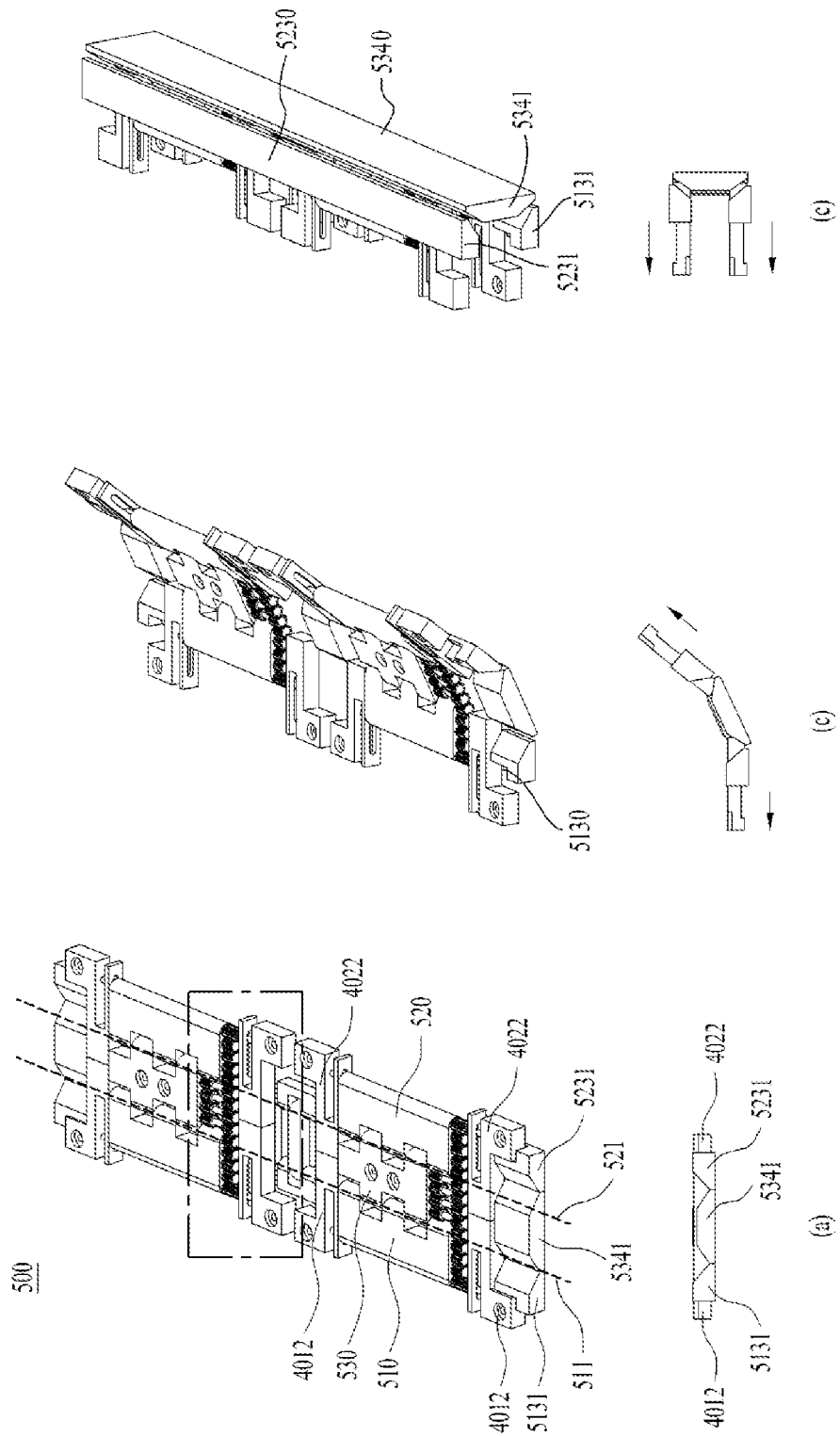

FIGS. 14 and 15 are views illustrating the operation of the hinge module 500 according to a folding angle of a mobile terminal according to an embodiment of the present disclosure.

Specifically, FIGS. 14-(a) and 15-(a) show the hinge module 500 in an unfolded state of the mobile terminal. FIGS. 14-(b) and 15-(b) show the hinge module 500 in a partially folded state of the mobile terminal. FIGS. 14-(c) and 15-(c) show the hinge module 500 in a fully folded state of the mobile terminal.

The top and bottom of each of FIGS. 14-(a) to 14-(c) show a perspective view of the hinge module 500 seen from one side and a side view of the hinge module 500 seen along the first shaft 511, respectively. The top and bottom of each of FIGS. 15-(a) to 15-(c) show a perspective view and a side views seen along the first shaft 511, respectively, with the first body 401 and the second body 402 coupled to the hinge module 500.

Referring to FIG. 14, when the first hinge connector 510 rotates around the first shaft 511, the first guide 4012 connected to the first hinge connector 510 moves away from the first shaft 511. Also, when the second hinge connector 520 rotates around the second shaft 512, the second guide 4022 connected to the second hinge connector 520 moves away from the second shaft 512.

Referring to FIG. 15, when the first body 401 and the second body 402 are folded, the first body 401 moves in a direction away from the hinge module 500, and the second body 402 moves in a direction away from the hinge module 500. Referring to FIG. 15-(b), with respect to one second body 402, the hinge module 500 moves in both side directions, and the first bodies 501 on both sides move away from the first hinge shafts 511, respectively. Referring to FIG. 15-(b), with reference to the one second body 402, the hinge modules 500 provided on both sides move in both side directions.

The mobile terminal of the present disclosure is a multi-foldable mobile terminal. As shown in FIG. 15, the hinge modules 500 may be provided on both sides of the second body 402 to connect the first body 401 provided on both sides of the second body 402. In a corresponding manner, the flexible display panel 410 may include first regions 411 and third regions 413 on both sides of the second region 412, as shown in FIG. 7.

In the multi-foldable mobile terminal of the present disclosure, the first bodies 401 are arranged on both sides of the second body 402 in the same plane in the unfolded state (FIG. 15-(a)). In the folded state (FIG. 15-(c)), the first body 401 provided on one side of the second body 402 may overlap the first body 401 provided on the opposite side of the second body 402.

In the multi-foldable mobile terminal of the present disclosure, in order to overlap the first bodies 401 connected to both sides of the second body 402 in the folded state, the hinge module 500 provided on the opposite side of the second body 402 may have a wider width of the hinge body 530 than the hinge module 500 provided on the one side of the second body 402. Here, the width of the hinge body 530 may correspond to a distance between the first shaft 511 and the second shaft 521.

In the multi-foldable mobile terminal of the present disclosure, in the folded state, the third regions 413 provided on both sides of the second region 412 of the flexible display panel 410 may form different radii of curvature. Alternatively, arcs formed by the third regions 413 provided on both sides of the second region 412 may have different lengths. When the radius of curvature is large or the length of the arc is short, the length of the flexible display panel 410 should be more compensated for. In this case, the first body 401 and the second body 402 are further apart from the first shaft 511 and the second shaft 512, respectively.

When the first body 401 and the second body 402 are further apart from the first shaft 511 and the second shaft 512 in the folded state, a larger part of the hinge module 500 may be exposed. In consideration of this issue, the hinge module 500 may further include a first hinge connector shield 5130 and a second hinge connector shield 5230 as well as the hinge body shield 5340. That is, depending on the radius of curvature or the length of the arc formed by the third region 413, the hinge module 500 may include only the hinge body shield 5340, or may further include the first hinge connector shield 5130 and the second hinge connector shield 5230 in addition to the hinge body shield 5340.

That is, the hinge module 500 provided on one side of the second body 402 may include the hinge body shield 5340 extending along the first shaft 511 on the rear surface of the hinge body 530. The hinge module provided on the opposite side of the second body may include the hinge body shield 5340, the first hinge connector shield 5130 extending on the rear surface of the first hinge connector along the first shaft, and the second hinge connector shield 5230 extending on the rear surfaces of the second hinge connector along the second shaft.

The above detailed description is therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A mobile terminal comprising:
a flexible display panel including a first region, a second region, and a third region arranged between the first region and the second region;
a first body configured to support the first region;
a second body configured to support the second region; and
a hinge module configured to support the third region, wherein the first body and the second body are rotatably connected to the hinge module,
wherein the hinge module comprises:
a hinge body including a first shaft and a second shaft on both sides thereof;
a first hinge connector pivoting on the first shaft and connected to the first body;
a second hinge connector pivoting on the second shaft and connected to the second body;
a hinge body shield arranged on a rear surface of the hinge body;
a first hinge connector shield provided on a rear surface of the first hinge connector; and
a second hinge connector shield provided on a rear surface of the second hinge connector, and
wherein:
a distance of the first body to the first shaft varies according to a rotation angle of the first hinge connector; and
a distance of the second body to the second shaft varies according to a rotation angle of the second hinge connector.

2. The mobile terminal of claim 1, wherein the first hinge connector and the second hinge connector rotate the same angle around the first shaft and the second shaft in opposite directions through a plurality of first gear groups operatively engaged with each other.

3. The mobile terminal of claim 2, wherein:
the first body comprises a first rack to be engaged with a first pinion provided to the first hinge connector, wherein a distance of the first rack to the first shaft varies according to rotation of the first pinion; and
the second body comprises a second rack to be engaged with a second pinion provided to the second hinge connector, wherein a distance of the second rack to the second shaft varies according to rotation of the second pinion,
wherein the first pinion and the second pinion are arranged on one side surface of the first hinge connector and one side surface of the second hinge connector, respectively, and
wherein the first pinion and the second pinion rotate according to the rotation angle of the first hinge connector and the second hinge connector.

4. The mobile terminal of claim 1, wherein, when the flexible display panel forms one flat surface, front surfaces of the hinge body, the first hinge connector and the second hinge connector of the hinge module are arranged in the same plane to support the third region.

5. The mobile terminal of claim 1, wherein:
the first body comprises:
a first guide including a guide groove to receive a first protrusion protruding from one side surface of the first hinge connector and inserted thereinto; and
the second body comprises:
a second guide including a guide groove to receive a second protrusion protruding from one side surface of the second hinge connector and inserted thereinto.

6. The mobile terminal of claim 5, wherein each of the first protrusion and the second protrusion includes a polygonal cross section with respect to a protruding direction thereof.

7. The mobile terminal of claim 5, wherein, when the flexible display panel forms one flat surface, the first guide and the second guide include front surfaces arranged in the same plane as a front surface of the hinge module to support the third region.

8. The mobile terminal of claim 7, wherein, when the flexible display panel forms the one flat surface, the first guide and the second guide contact each other to support the third region.

9. The mobile terminal of claim 1, wherein:
the first body comprises a first hinge cover extending toward the hinge module; and
the second body comprises a second hinge cover extending toward the hinge module,
wherein, when the flexible display panel forms one flat surface, the first hinge cover and the second hinge cover contact each other at a rear side of the hinge module to shield the hinge module from an outside.

10. The mobile terminal of claim 1,
wherein the hinge body shield comprises a central sidewall extending along the two shafts and protruding toward the flexible display panel.

11. The mobile terminal of claim 10, wherein, when the flexible display panel forms one flat surface, the central sidewall includes a front surface arranged in the same plane as a front surface of the hinge body to support the third region.

12. The mobile terminal of claim 10,
wherein the first hinge connector shield and the second hinge connector shield include a first sidewall and a second sidewall extending along the two shafts and protruding toward the flexible display panel, respectively.

13. The mobile terminal of claim 12, wherein, when the flexible display panel forms one flat surface, the first sidewall and the second sidewall include front surfaces arranged in the same plane as front surfaces of the first hinge connector and the second hinge connector to support the third region.

14. The mobile terminal of claim 12, wherein the first sidewall includes a first slope and the second sidewall includes a second slope, wherein the first slope and the second slope are arranged on both sides of the central sidewall and inclined toward the central sidewall,
wherein the central sidewall includes a third slope and a fourth slope inclined toward the first sidewall or the second sidewall, the third slope and the fourth slope corresponding to the first slope or the second slope.

15. The mobile terminal of claim 1, wherein the first body is arranged on both sides of the second region,
wherein the first region and the third region of the flexible display panel are arranged on both sides of the second region, and
wherein the second body is connected to the first body arranged on both sides through the hinge module.

16. The mobile terminal of claim 15, wherein, in an unfolded state of the mobile terminal, the first body on both sides of the second body are arranged in the same plane, and
wherein, in a folded state of the mobile terminal, the first body arranged on one side of the second body overlap the first body arranged on an opposite side of the second body.

17. The mobile terminal of claim 16, wherein the hinge body of the hinge module provided on the opposite side of the second body has a wider width than the hinge body of the hinge module provided on the one side of the second body.

18. The mobile terminal of claim 16, wherein:
the hinge module provided on the one side of the second body comprises:
a hinge body shield extending on a rear surface of the hinge body along the first shaft; and
the hinge module provided on the opposite side of the second body comprises:
a hinge body shield;
a first hinge connector shield extending on a rear surface of the first hinge connector along the first shaft; and
a second hinge connector shield extending on a rear surface of the second hinge connector along the first shaft.

19. A mobile terminal comprising:
a flexible display panel including a first region, a second region, and a third region arranged between the first region and the second region;
a first body configured to support a rear side of the first region;
a second body configured to support a rear side of the second region;
a hinge module configured to support the third region, wherein the first body and the second body are rotatably connected to hinge module;
a first hinge cover extending from the first body toward the hinge module;
a second hinge cover extending from the second body toward the hinge module; and
wherein, when the flexible display panel forms one flat surface, the first hinge cover and the second hinge cover contact each other at the rear side of the hinge module to shield the hinge module from an outside,
wherein the hinge module comprises:
a hinge body including a first shaft and a second shaft on both sides thereof;
a first hinge connector pivoting on the first shaft and connected to the first body;
a second hinge connector pivoting on the second shaft and connected to the second body, and
wherein:
a distance of the first body to the first shaft varies according to a rotation angle of the first hinge connector; and
a distance of the second body to the second shaft varies according to a rotation angle of the second hinge connector.

20. A mobile terminal comprising:
a flexible display panel including a first region, a second region, and a third region arranged between the first region and the second region, wherein the first region, the third region and the second region are arranged in a first direction;

a first body configured to support the first region;

a second body configured to support the second region; and a hinge module configured to support the third region, wherein the first body and the second body are rotatably connected to the hinge module, a first guide extending from the first body toward the first direction;

a second guide extending from the second body toward the second direction opposite to the first direction and placed in the first direction of the first guide, wherein the first guide and the second guide contact each other to support the third region when the flexible display panel forms one flat surface, wherein the hinge module comprises:

a hinge body including a first shaft and a second shaft on both sides thereof;

a first hinge connector pivoting on the first shaft and connected to the first body;

a second hinge connector pivoting on the second shaft and connected to the second body, and wherein:

a distance of the first body to the first shaft varies according to a rotation angle of the first hinge connector; and a distance of the second body to the second shaft varies according to a rotation angle of the second hinge connector.

* * * * *